United States Patent Office 3,451,459
Patented June 24, 1969

3,451,459
RUBBER BLENDS COMPRISING NATURAL RUBBER, CIS-POLYBUTADIENE AND A TERTIARY AMINE
Edward M. Bevilacqua, Allendale, N.J., assignor to Uniroyal, Inc., New York, N.Y., a corporation of New Jersey
No Drawing. Continuation-in-part of application Ser. No. 534,435, Mar. 15, 1966. This application Dec. 15, 1966, Ser. No. 601,854
Int. Cl. C08c 9/04, 11/44
U.S. Cl. 152—330
1 Claim

ABSTRACT OF THE DISCLOSURE

Tear resistance of pneumatic tire treads made from blends of NR and cis-BR can be improved, without increase in hysteresis, by addition of certain aliphatic amines, e.g., 2-aminoheptane, octyl diethanolamine, n-dodecylamine, and N,N-bis(isobutoxymethyl)-n-docecylamine.

---

This application is a continuation-in-part of copending U.S. application Ser. No. 534,435, filed Mar. 15, 1966, and now abandoned.

This invention relates to rubber compositions having improved tear strength, and particularly to such compositions used as tire treads.

During the past decade manufacturers of pneumatic tires have used increasing proportions of cis-polybutadiene, a high molecular weight polymer of butadiene at least 85% 1,4-cis in configuration, in both passenger and "heavy-service" tires. This polymer confers improved properties on the tires, including increased resistance to abrasion and to cracking at the base of the tread grooves.

In large tires having a thick cross-section, the heat generated by flexing as the tire rolls is dissipated slowly. It is, therefore, desirable to use compositions which develop little heat, i.e., have low hysteresis, so as to prevent the tires from becoming too hot and deteriorating rapidly. Cis-polyisoprene and cis-polybutadiene may both yield tread compositions having low hysteresis, but the resistance of cis-polybutadiene tread compositions to tearing at high temperatures is low. Therefore, in tire tread compositions of blends with natural rubber or synthetic cis-polyisoprene, the proportion of cis-polybutadiene which can be used is limited by its low resistance to tearing.

The effect of the low tearing resistance is that tires with treads containing a high proportiton of cis-polybutadiene undergo a form of failure in use variously called "chunk-out" or "outer-row tearing." It involves abrupt tearing out of rather large sections of tread, the tear usually beginning at the base of a groove. "Chunk-out" occurs most frequently when tires become hot and the tread is subjected to high strains, as in mounting a curb, or driving off and onto paved surfaces. It is this form of failure which limits the amount of cis-polybutadiene that can be used in blends with natural rubber in the treads of large heavy-service tires. The need for a solution to this problem is shown, for example, by the discussion of a paper by L. H. Krol presented at an international meeting on synthetic rubber in 1963 and reported in Rubber and Plastic Age, vol. 45, number 11, pages 1341 et seq. (1964).

Although resistance to tearing can be increased by increasing the proportion of carbon black or other filler in the tread composition, this procedure simultaneously increases hysteresis, so that the advantages of low heat generation are lost and one potential source of tire failure is replaced by another. The practical balance between the requirements of low heat generation and high resistance to tearing is such that manufacturers have until now been limited to using approximately one part by weight of cis-polybutadiene to three to four parts by weight of natural rubber in heavy-service tires.

In accordance with this invention, it has been discovered that tear resistance of tread compositions made from blends of natural rubber and cis-polybutadiene can be substantially improved, without attendant increase in hysteresis, by the addition of certain aliphatic amines. The aliphatic amines of the invention may be defined by the general formula:

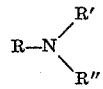

wherein R is an aliphatic group having 2 to 25 carbon atoms and with or without —C—O— interruptions, and R' and R" are each hydrogen or an aliphatic group having 2 to 25 carbon atoms and at least one —C—O— interruption.

Particularly preferred subgeneric classes are:

(1) 2-aminoalkanes, RCH(NH$_2$)CH$_3$, where R is a normal primary aliphatic group containing 5 to 12 carbon atoms;

(2) 1 - [N,N - di(beta-hydroxyethyl)amino]alkanes, RN(CH$_2$CH$_2$OH)$_2$, where R is a normal primary aliphatic group containing 8 to 15 carbon atoms, (3) 1-aminoalkanes, RNH$_2$, where R is a normal primary aliphatic group containing 5 to 20 carbon atoms; and (4) N,N-bis(alkoxyalkyl)alkylamine, RN(CH$_2$OR')$_2$ where R and R' are each aliphatic hydrocarbon groups having from 2 to 25 carbon atoms.

Although it is not essential to the invention, it has been noted that amines, because of their accelerating effect on the curing rate, must often be used with a retarder of vulcanization, such as salicyclic acid, phthalic anhydride, N-nitrosodiphenyl amine, and the like, and compositions including such materials are within the scope of the invention. Where required, from 0.5 to 1.5 parts of retarder, by weight, are added for each part of amine, preferably an equal weight.

Examples of the amines of group (1) are: 2-aminoheptane, 2-aminooctane, 2-aminodecane, 2-aminododecane. Examples of group (2) are octyl, decyl, tridecyl and pentadecyl diethanolamines; and examples of the group (3) compounds are n-amylamine, n-hexylamine, n-octylamine, n-dodecylamine, laurylamine, and stearylamine. Representative compounds of the group (4) are:

N,N-bis(butoxymethyl)butylamine;
N,N-bis(butoxymethyl)-t-butylamine;
N,N-bis(methoxymethyl)cyclohexylamine;
N,N-bis(cyclohexoxymethyl)butylamine (crude);
N,N-bis(sec.-butoxymethyl)butylamine;
N,N-bis(butoxymethyl)-sec.-butylamine;
N,N-bis(butoxymethyl)cyclohexylamine;
N,N-bis(isobutoxymethyl)hexylamine;
N,N-bis(butoxymethyl)methylamine;

other useful compounds are:

N,N-bis(isobutoxymethyl)allylamine;
N,N-bis(butoxymethyl)methoxyethylamine;
N,N-bis(butoxymethyl)-3-methoxypropylamine;
N,N-bis(butoxymethyl)-3-ethoxyethoxypropylamine;
N,N-bis(tetrahydrofurfuryloxymethyl)-n-propylamine;
N,N-bis(cyanoethoxymethyl)-n-propylamine;
N,N-bis(methoxyethoxymethyl)isobutylamine;
N,N-bis(2-dimethylaminoethoxymethyl)propylamine;
N,N-bis(2-methoxyethoxymethyl)-3-methoxypropylamine;
N,N-bis(butoxymethyl)-N',N'-dimethyl-1,3-propanediamine.

Broadly, from 0.3 to 5.0 parts of the amine per one hundred parts of rubber (phr.) may be used, preferably more than 0.5 phr., and, for best results, 0.8 to 2 phr.

The invention can be used for vulcanized compositions made from blends of natural rubber with cis-polybutadiene containing at least 85% 1,4-cis configuration, which have ratios of natural rubber to polybutadiene of 1/5 to 5/1, the preferred proportions being 1/3 to 3/1.

Reinforcing amounts of carbon black or silica are present in the rubber blends as filler. Generally from 20 to 100 parts per 100 parts of hydrocarbon (i.e., rubber or rubber plus oil as the case may be) may be used, most preferably, from 40 to 60 parts.

The occurrence of "chunk-out" in tires is directly correlated with a property of the vulcanized tread composition which can be measured readily in a laboratory test such as that described by A. G. Thomas, Journal of Applied Polymer Science, volume 3, page 168 (1960) as the "simple-extension" or "trousers" tear test. An increase in tearing resistance, as measured by the force required to propagate a tear, produces a parallel increase in resistance to "chunk-out" in the treads of tires.

In the application of this invention the mixture of ingredients in the tread composition may be made by any convenient method. Standard milling and mixing procedures were employed in the examples illustrating the invention, all parts being by weight.

EXAMPLE I

Four tread compositions were mixed according to the following recipes, using a small laboratory Banbury mixer.

| Composition, parts | Mixture number | | | |
|---|---|---|---|---|
|  | 1 | 2 | 3 | 4 |
| Ribbed smoked sheets | 50 | 50 | 50 | 50 |
| Cis-polybutadiene (approximately 93% cis) | 50 | 50 | 50 | 50 |
| ISAF carbon black | 52 | 52 | 52 | 52 |
| Zinc oxide | 5 | 5 | 5 | 5 |
| Stearic acid | 1 | 1 | 1 | 1 |
| Aromatic oil [1] | 10 | 10 | 10 | 10 |
| N-isopropyl-N'-phenyl-p-phenylenediamine | 2 | 2 | 2 | 2 |
| Mixture of aliphatic primary amines, predominantly dodecylamine | 0 | 0.5 | 1.0 | 2.0 |

[1] 70+5% aromatic, 20%±5% saturated, by analysis on silica gel, specific gravity 0.98 at 60° F. and viscosity (Saybolt Universal Seconds) 95 at 210° F.

To portions of these masterbatch mixtures, sulfur and N-cyclohexylbenzothiazole sulfenamide ("CBS") were added on a laboratory mill in the amounts shown in Table I. The mixtures were then vulcanized in molds in a platen press for 45 minutes at 145° C. as slabs 6" x 6" x 0.1". Test pieces 1" x 3" were cut from the slabs and a "trousers tear" test run substantially as described by Thomas in the article referred to above. Each sample was held in an oven at 250° F. during the test. The force required to cause a tear to progress through the test piece at 2 inches per minute is tabulated as tear strength:

TABLE I

| Sample | A | B | C | D | E | F | G | H |
|---|---|---|---|---|---|---|---|---|
| Mixture number | 1 | 1 | 2 | 2 | 3 | 3 | 4 | 4 |
| Weight | 170 | 170 | 170.5 | 170.5 | 171 | 171 | 172 | 172 |
| CBS | 0.8 | 0.8 | 0.8 | 0.8 | 0.8 | 0.8 | 0.8 | 0.8 |
| Sulfur | 2.0 | 2.5 | 2.0 | 2.5 | 2.0 | 2.5 | 2.0 | 2.5 |
| Tear strength, lbs./in | 111 | 115 | 122 | 138 | 193 | 211 | 196 | 182 |

A comparison of Samples A and B with Samples C through H shows clearly the improved tear strength obtained by the addition of the primary amine.

EXAMPLE II

A second example shows that, although it is possible to formulate tread stock compositions from the individual rubbers (i.e., cis-polybutadiene and natural rubber) so that each has high tear strength after vulcanization, vulcanizates prepared from blends of the two have low tear strength. Addition of amine to the blend, in accordance with the invention, raises the tear strength significantly. Four mixtures were made up according to the following recipes.

TABLE II

| Composition | Mixture number | | | |
|---|---|---|---|---|
|  | 1 | 2 | 3 | 4 |
| Ribbed smoked sheets | 100 |  | 100 |  |
| Cis-polybutadiene [1] |  | 100 |  | 100 |
| ISAF carbon black | 40 | 65 | 40 | 65 |
| Aromatic oil [2] | 10 | 10 | 10 | 10 |
| Zinc oxide | 3 | 3 | 3 | 3 |
| Stearic acid | 1.5 | 1.5 | 1.5 | 1.5 |
| CBS | 0.8 | 0.8 | 0.8 | 0.8 |
| Sulfur | 2.1 | 2.1 | 2.1 | 2.1 |
| N-isopropyl-N'-phenyl-p-phenylenediamine | 1.5 | 1.5 | 1.5 | 1.5 |
| Mixture of aliphatic amines, predominantly octadecylamine | 0 | 0 | 2 | 2 |

[1] Approximately 93% cis.
[2] 70+5% aromatic, 20%±5% saturated, by analysis on silica gel, specific gravity 0.98 at 60° F., and viscosity (Saybolt Universal Seconds) 95 at 210° F.

Portions of each were vulcanized and tested as described in Example I. In addition, blends were made of mixtures 1 and 2 and of mixtures 3 and 4, to give equal weights of the two kinds of rubber in each blend. The tear strength values in Table IIA show that the blend containing no amine has much lower tear strength than the component mixtures, and that the blend containing the amine has significantly higher tear strength.

Table IIA

| Vulcanized mixture No.: | Tear strength (lbs. per inch) |
|---|---|
| 1 | 199 |
| 2 | 198 |
| 3 | 225 |
| 4 | 198 |
| Blended 1 and 2 | 105 |
| Blended 3 and 4 | 167 |

EXAMPLE III

In a third example, a first masterbatch mixture was prepared as in mixture 1 of Example I, and a second containing in addition 2 parts of tertiary amine material derived from tallow. This amine has the structure $RN(CH_2CH_2OH)_2$, where R is predominantly a $C_{18}$ linear aliphatic group. To separate portions of each was added 0.8 part by weight of CBS and sulfur in the amounts shown in the table below. The final mixtures were vulcanized and tested as described. The results are shown in Table III.

TABLE III

| Additive | Sulfur | Tear strength |
|---|---|---|
| None | 2.0 | 95 |
| Do | 2.5 | 111 |
| Amine | 2.0 | 166 |
| Do | 2.5 | 191 |

EXAMPLE IV

A fourth example shows that low-boiling amines are also effective:

Mixtures were prepared using the recipe of mixture 1, Example I, except that the zinc oxide was reduced to 2 phr. and the phenylenediamine to 1.5 phr. The effect of the addition of 1.5 phr. of secondary-heptylamine on the tear strength of these rubber compositions, after vulcanization with the amount of sulfur indicated, is illustrated below:

TABLE IV

| Sulfur, phr. | Amine | Tear strength; 250° F., p.p.i. |
|---|---|---|
| 2.1 | Absent | 72 |
| 2.4 | do | 81 |
| 2.1 | Present | 125 |
| 2.4 | do | 164 |

EXAMPLE V

A fifth example shows that amines used according to this invention improve tear strength without raising hysteresis, as increased amounts of carbon black would do. Compositions were mixed and vulcanized as described in Example I, except that 55 phr. ISAF carbon black, instead of 52, and the tallow amines of Example III, in the amounts shown in Table V, were used. Results in Table V show that the amines have little effect on the degree of vulcanization and do not increase hysteresis. To measure the degree of vulcanization, the stress at 300% elongation is measured on a ring test specimen as described by Brooks, Ewart and Boggs, Kautschuk und Gummi, vol. 12 (1959), pages WT 179 et seq. The torsional hysteresis is the logarithmic decrement determined according to the procedure described by Mooney and Gerke, Rubber Chemistry and Technology, vol. 14 (1941), page 35. The larger the hysteresis, the greater the energy dissipated as heat on flexing and hence the greater the temperature rise in a running tire.

TABLE V

| Amine, phr. | Sulfur, phr. | Tensile stress at 300% elongation | Torsional hysteresis (280° F.) | Tear strength (250° F.) |
|---|---|---|---|---|
| None | 2 | 1,010 | 0.168 | 100 |
| Do | 2.5 | 1,070 | 0.153 | 123 |
| 2 | 2 | 1,095 | 0.142 | 134 |
| 2 | 2.5 | 1,175 | 0.122 | 168 |
| 2 | 2 | 950 | 0.151 | 201 |
| 2 | 2.5 | 1,195 | 0.131 | 158 |

EXAMPLE VI

Three tread compositions were mixed having the composition: natural rubber ribbed smoked sheets 60, cis-polybutadiene as in Example I 40, ISAF carbon black 50, zinc oxide 5, stearic acid 1, N-isopropyl-N'-phenyl-p-phenylenediamine 1.5, aromatic oil of Example I 10, N-cyclohexylbenzothiazole sulfenamide 0.8, and sulfur 2.2, and other ingredients as in Table VI. Specimens were vulcanized and tested as in Example I, with results tabulated in Table VI.

TABLE VI

| Composition | 1 | 2 | 3 |
|---|---|---|---|
| N,N-bis(isobutoxymethyl)-n-dodecylamine | None | 2 | 2 |
| Resorcinol | None | None | 0.8 |
| Tear strength at 250° F., p.p.i. | 99 | 246 | 160 |

The above data clearly show the marked superiority of the tear strength of the compositions containing the amine in accordance with the teaching of the invention.

Having thus described my invention, what I claim and desire to protect by Letters Patent is:

1. A pneumatic tire having a tread characterized by improved tear resistance and resistance to chunk-out, made of a vulcanized rubber composition comprising a blend of cis-polybutadiene, having at least 85% 1,4-cis content, and natural rubber, in ratio of from 1:5 to 5:1, containing reinforcing amounts of filler and from 0.3 to 5.0 phr. of an aliphatic amine of the formula:

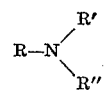

wherein R is an aliphatic group having 2 to 25 carbon atoms with or without —C—O— interruptions, R' and R'' are —CH$_2$OR''' and R''' is an aliphatic hydrocarbon group having from 2 to 25 carbon atoms.

References Cited

UNITED STATES PATENTS

| 2,764,572 | 9/1956 | Pechukas | 260—41.5 |
| 3,060,989 | 10/1962 | Railsback et al. | 260—5 |
| 2,140,259 | 9/1935 | Clifford | 260—798 |
| 2,468,159 | 8/1945 | Barton | 260—798 |
| 3,310,508 | 3/1967 | Roy | 260—5 |

FOREIGN PATENTS 963,244    7/1964    Great Britain.

SAMUEL H. BLECH, *Primary Examiner.*

M. J. TULLY, *Assistant Examiner.*

U.S. Cl. X.R.

260—5, 33.6, 41.5, 45.9